Patented Oct. 4, 1932

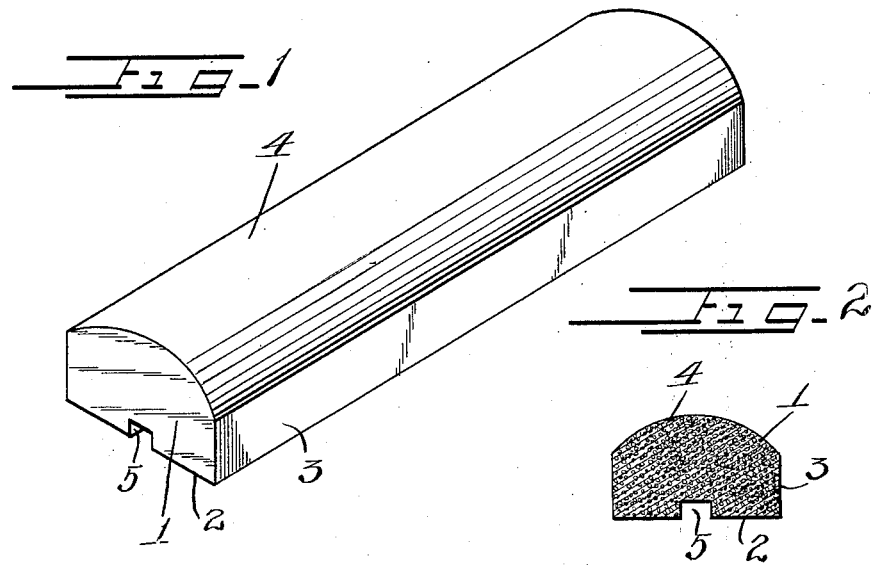
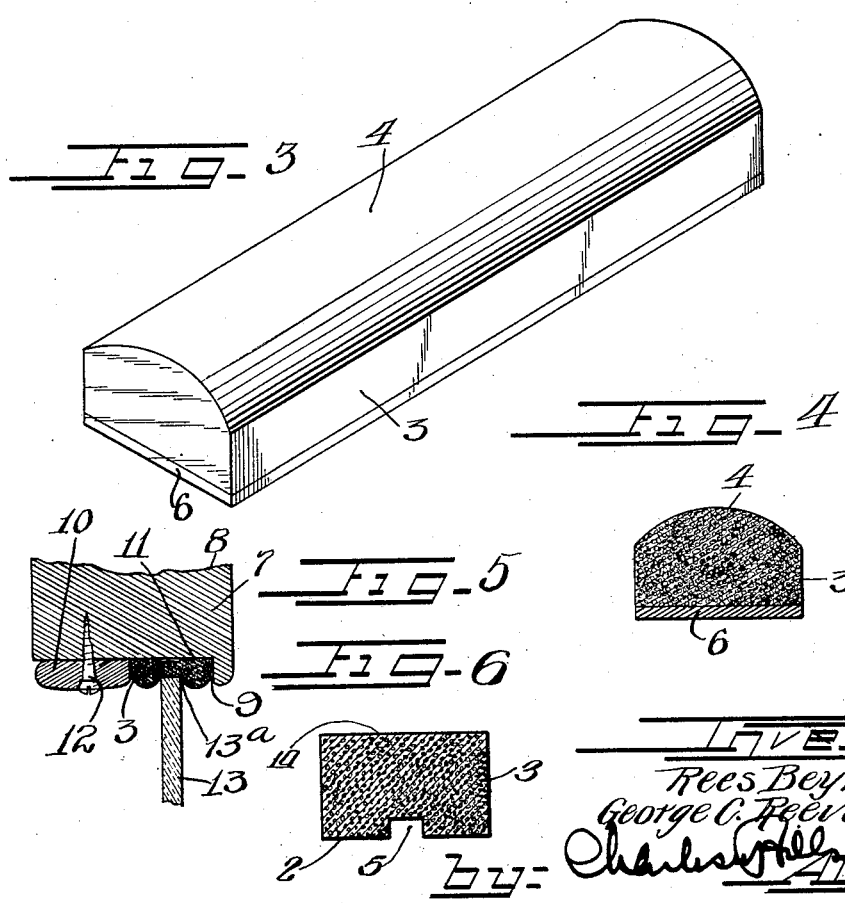

1,880,699

UNITED STATES PATENT OFFICE

REES BEYNON, OF CHICAGO, AND GEORGE C. REEVES, OF GLEN ELLYN, ILLINOIS, ASSIGNORS TO DRYDEN RUBBER COMPANY, OF CHICAGO, ILLINOIS, A CORPORATION OF ILLINOIS

CHANNEL STRIP

Application filed September 12, 1930. Serial No. 481,420.

This invention relates to an improved channel strip having special utility in connection with vehicle windows for cushioning the impact of a slidable window panel against the frame and for sealing the joint between these members.

These devices have come into extensive use in recent years, especially in connection with automobile windows, and, as a result, many and various forms of these devices have been constructed and employed. Many of these forms involve intricate problems in design, which increase the difficulties of forming the strip and hence their manufacturing cost. In other forms, material has been used which does not possess sufficient flexibility to provide a good, weather-tight seal between the window panel and frame or members with which the strip is used. On the other hand, some forms of body material are of sufficient flexibility to provide a tight seal, but, in these cases, the strip, because of its flexibility, is difficult to handle in installing the strip in place.

We have now constructed a very simple form of strip of a highly compressible material which provides a very strong, weather-tight seal between the parts with which it is used, and, at the same time, is so reinforced as to permit its being easy to handle and to fixedly and securely fasten in place.

It is an object, therefore, of this invention to provide a channel strip from a highly compressible material having a simple design, thereby facilitating and reducing the cost of its manufacture.

It is a further important object of this invention to provide a strip for effectively sealing the joint between a vehicle window panel and frame, which is so constructed as to tightly grip the edge of the window and, at the same time, permit its secure attachment to the window frame.

Other and further important objects of this invention will become apparent from the following description and appended claim.

Referring to the drawing, which discloses various embodiments of our invention:

Figure 1 is an isometric view of one form of our improved channel strip.

Figure 2 is a cross-sectional view of the strip of Figure 1.

Figure 3 is an isometric view of a slightly modified form of strip.

Figure 4 is a cross-sectional view of the strip of Figure 3.

Figure 5 is a fragmentary cross-sectional view through an automobile door showing our improved strip applied to the window frame thereof.

Figure 6 is a cross-sectional view of a slightly modified form of strip.

Our improved strip, according to Figures 1 and 2, comprises a molded, elongated strip formed of a highly compressible material, preferably sponge rubber. Said strip has plain back and side surfaces 2 and 3 and a convex or dome-shaped front surface 4. Preferably, a longitudinal channel or groove 5 is provided in the back surface 2 of said strip to receive the heads of screws or the like which project from the surface to which said base is secured. In this way, said screw heads do not cause the strip to be distorted when the same is secured in place. Furthermore, said channel lies directly opposite that portion of the front surface which is contacted by the edge of the window panel to facilitate the compression of said strip by the channel, thereby increasing the tenacity with which said strip grips the upper side edges of said panel as will be later explained.

In Figures 3 and 4, we have disclosed a slightly modified form of strip in which the groove or channel 5 is omitted and the base 2 of the strip is provided with a relatively thick layer 6 of hard rubber or the like vulcanized to said surface 2 to reinforce the same and provide a relatively strong, rigid backing by means of which the strip may be readily secured in place.

The strip disclosed in Figure 6 differs from that of Figures 1 and 2 in that it is constructed with a substantially rectangular cross-section which provides a plain front surface 14 instead of a dome-shaped front surface. The sealing action of this strip is similar to that of the strip of Figures 1 and 2, but will be slightly less effective due to the substantial uniform thickness of the strip.

In Figure 5, the strip is shown in its preferred use as applied to the upper stile 7 of a vehicle window frame 8. Said stile 7 is rabbeted at 9 to provide, in conjunction with the molding 10, a groove 11 for the reception of said strip 1. In mounting the strip in place, the back of the strip is first cemented or otherwise secured to the stile 7 and the molding 10 then secured to said stile 7 by means of screws 12 or the like.

The sealing action of said strip is also clearly shown in Figure 5. When the window panel 13 is elevated against the front surface 4 of said strip, it compresses the mid-portion of the strip engaged by the upper edge 13a, thereby drawing the sides 3 of said strip away from the walls of the groove 11, and the front surface of the strip not engaged by the edge 13a into contact with the upper side edges of said panel 13 to thereby form a tight seal for said edges. The tension which draws the front surface 4 of said strip against the upper side edges of said panel is transmitted over the surface of the strip by the surface skin of the sponge rubber. When the device of Figures 1 and 2 is employed as shown in Figure 5, the compression of the strip is greatly facilitated by the groove or channel 5 provided in the back portion of said strip, as will be readily appreciated from a reference to Figure 5.

While we have disclosed the channel strip 1 as applied to the upper stile of the frame 8, it is to be appreciated that the use of the strip is not so limited, as the same may be used to form a weather strip between any pair of contacting edges.

It can thus be appreciated that we have constructed a simple form of weather strip which has great utility in sealing the joint between two members, especially that between the upper edge of a movable window panel and its frame.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

A channel strip for buffing and sealing the upper edge of a window panel against its frame comprising a molded strip of sponge rubber having a back surface adapted to be secured in said frame, said back surface having a longitudinal groove in the mid-part thereof, said strip having a dome-shaped front surface with its highest point opposite said slot whereby when said window is elevated against said front surface it compresses the mid-part of the same over said groove thereby causing a tension to be exerted on the outer part of said front surface which draws the same into sealing engagement with the upper side edges of said panel.

In testimony whereof, we have hereunto subscribed our names at Chicago, Cook County, Illinois.

GEORGE C. REEVES.
REES BEYNON.